(12) United States Patent
Levens et al.

(10) Patent No.: US 9,589,059 B2
(45) Date of Patent: Mar. 7, 2017

(54) PERSONALIZING COMMERCIAL CONTENT IN REQUESTED WEB PAGES

(71) Applicant: Helpa Research Inc., Sydney (AU)

(72) Inventors: Michael Levens, Surry Hills (AU); Colin Fabig, Clontarf (AU); Ari Klinger, Northbridge (AU); Matt Cudworth, Crows Nest (AU)

(73) Assignee: Helpa Services Australia PTY LTD, Contarf, New South Wales (AU)

( * ) Notice: Subject to any disclaimer, the term of this patent is extended or adjusted under 35 U.S.C. 154(b) by 295 days.

(21) Appl. No.: 14/220,322

(22) Filed: Mar. 20, 2014

(65) Prior Publication Data
US 2014/0289218 A1    Sep. 25, 2014

Related U.S. Application Data

(60) Provisional application No. 61/804,279, filed on Mar. 22, 2013.

(51) Int. Cl.
*G06Q 30/02* (2012.01)
*G06F 17/30* (2006.01)

(52) U.S. Cl.
CPC ....... *G06F 17/30867* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 6,564,225 | B1* | 5/2003 | Brogliatti | G06F 17/30277 |
| 2004/0139001 | A1* | 7/2004 | Henriques | G06Q 10/087 |
| | | | | 705/39 |
| 2005/0137958 | A1* | 6/2005 | Huber | G06Q 30/02 |
| | | | | 705/37 |
| 2005/0171863 | A1* | 8/2005 | Hagen | G06Q 30/0601 |
| | | | | 705/26.1 |
| 2007/0043617 | A1* | 2/2007 | Stein | G06Q 30/0267 |
| | | | | 705/14.64 |
| 2010/0094704 | A1* | 4/2010 | Subramanian | G06Q 30/02 |
| | | | | 705/14.45 |
| 2011/0087550 | A1* | 4/2011 | Fordyce, III | G06Q 30/02 |
| | | | | 705/14.65 |
| 2013/0013427 | A1* | 1/2013 | Gonsalves | G06Q 30/02 |
| | | | | 705/14.73 |

* cited by examiner

*Primary Examiner* — Wilson Lee
(74) *Attorney, Agent, or Firm* — Gard & Kaslow LLP

(57) ABSTRACT

When a user requests display on a computing device of a web page that contains commercial content, the existing commercial content is replaced by other commercial content that matches a stored shopping profile of the user if such matching commercial content is available. Otherwise, the existing commercial content is replaced by blank space. In this way, the user is provided with commercial content of interest, the blank space, rather than whatever commercial content the web page originally contained.

12 Claims, 4 Drawing Sheets

FIGURE 4

PERSONALIZING COMMERCIAL CONTENT IN REQUESTED WEB PAGES

PRIORITY

This non-provisional U.S. patent application claims priority to, and the benefit of, U.S. Provisional Patent Application No. 61/804,279, filed Mar. 22, 2013, and entitled "Single Source Univeral Shopping Profile", the entirety of which is incorporated by reference herein.

BACKGROUND

Field

This patent application is directed generally to the generation and display of web pages having commercial content and more particularly to customization or personification of same.

Description of Related Art

Commercial content in the form of disruptive advertising is in decline as consumers do not like viewing unsolicited advertising they do not want. Therefore, consumers are increasingly finding ways to avoid such advertising by performing such tasks as skipping, multi-tasking or blocking. Further, although consumers are generally displeased with advertising, when they want something they must actively search out such commercial content. The result is either frustration and annoyance when commercial content is unwanted or bothersome and focused efforts to obtain desired commercial content. What is needed therefore is an automated way to provide consumers with commercial content that is of interest to them.

SUMMARY

An example method described herein comprises: receiving at a computing device a request from a user to view a third party web page, the third party web page having existing commercial content; retrieving, over a network by the computing device from an advertising control manager server, shopping profile data of the user; querying, over the network by the computing device, a database of the advertising control manager server for stored commercial content that matches the received shopping profile data of the user; replacing, by the computing device, the existing commercial content in the third party web page with matching commercial content if matching commercial content is found in the query of the database of the advertising control manager server; replacing, by the computing device, the existing commercial content in the third party web page with blank content if no matching commercial content is found in the query of the database of the advertising control manager server; and displaying on the computing device the third party web page with the matching commercial content or the blank content.

An example non-transitory storage medium having instructions embodied thereon, the instructions executable by one or more processors to perform operations comprising: receiving at a computing device a request from a suer to view a third party web page, the third party web page having existing commercial content; retrieving, over a network by the computing device from an advertising control manager server, shopping profile data of the user; querying, over the network by the computing device, a database of the advertising control manager server for stored commercial content that matches the received shopping profile data of the user; replacing, by the computing device, the existing commercial content in the third party web page with matching commercial content if matching commercial content is found in the query of the database of the advertising control manager server; replacing, by the computing device, the existing commercial content in the third party web page with blank content if no matching commercial content is found in the query of the database of the advertising control manager server; and displaying on the computing device the third party web page with the matching commercial content or the blank content.

BRIEF DESCRIPTION OF THE DRAWINGS

FIG. 4 is an example third party web page as would be displayed both before and after application of the present approach.

DETAILED DESCRIPTION

In the present approach, when a user requests display of a web page that contains some existing commercial content (e.g., an advertisement or other marketing message in the form of text, images, sounds, video or animations), the existing commercial content is replaced by other commercial content that matches a stored shopping profile of the user if such matching commercial content is available otherwise with blank content. In this way, the user is provided with commercial content of interest, or blank content, rather than whatever commercial content the web page originally contained.

Figure 1:
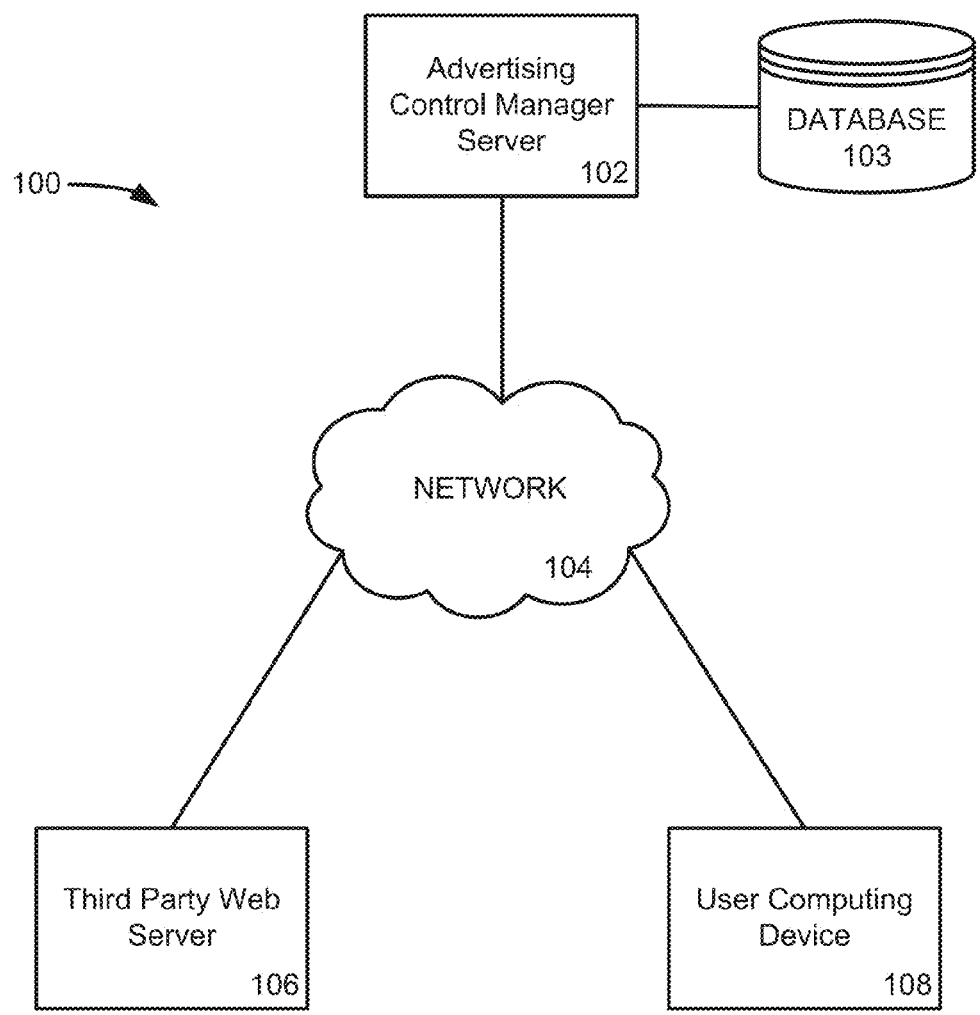
FIG. 1 is a diagram of an example environment in which various embodiments can be implemented.

In prior approaches known in the art, referring now to FIG. 1, a user wishing to view a web page of an online source such as a newspaper may make such a request by clicking on a web site link of the online newspaper or entering a web address of the online newspaper into an Internet browser on a user computing device 108. The user computing device 108 would then communicate across a network (e.g., the Internet) with a third party web server 106 to retrieve the request web page of the online newspaper. User computing device 108 would then display to the user the retrieved web page which oftentimes includes some existing commercial content (i.e., advertisements). The existing commercial content is typically chosen either by the online newspaper or by some advertiser who is paying the online newspaper to have their advertisement be included. Regardless, it is unlikely that such existing commercial content is of any particular interest to the user wishing to view the substantive content of the online newspaper web page. This can both distract to and annoy the user.

Conversely, in the present approach, when the user requests display of the online newspaper web page that contains some existing commercial content, database 103 is queried for commercial content that matches a stored shopping profile of the user and the matching commercial content then replaces the existing commercial content. As a result, the user is provided with a display on user computing device 108 of commercial content that is of interest to the user therefore providing a more valuable and less annoying user experience.

In an embodiment, this approach is accomplished by installing an Advertising Control Manager (ACM) software application onto user computing device 108 which, in various embodiments, is a computer, tablet, mobile telephone (e.g., smartphone), or other electronic device capable of running an application and providing network access as described herein. The ACM application can be downloaded across the network 104 from either an Advertising Control Manager (ACM) server 102 or the third party web server 106, or provided in other ways known in the art to distribute application software. In various embodiments, the ACM application can be a standalone application, an applet configured to run within a web browser, or a web browser that includes the ACM application functionality described herein.

In this embodiment, this approach is further accomplished by storing a shopping profile of the user (referred to herein as a single source universal shopping profile (SSUSP)) in database 103 of ACM server 102. The user shopping profile can contain data fields indicating areas of interest or planned activities of the user (e.g., home improvement, having a baby, saving money, technology devices owned, etc.), items the user anticipates purchasing (e.g., electronics, sporting goods, a house, a car, hand bags, shoes, etc.), as well as demographic and/or geographic information about the user (e.g., gender, age, income, marital status, living situation (e.g., rent or own), etc.). Such profile information can be obtained in various ways known in the art including by querying the user or observing the user's various online interactions via user computing device 108.

In this embodiment, this approach is still further accomplished by storing commercial content in database 103 of ACM server 102. Such commercial content can be obtained by AC server 102 via advertiser solicitation or other ways known in the art including by accessing advertising exchanges (i.e., platforms facilitating the buying and selling of online media advertising inventory) and advertising networks (i.e., companies that connect companies wanting to advertising with companies that want to host advertisements). It is to be understood that the commercial content stored in database 103 can, in various embodiments, be the entirety of the commercial content itself (e.g., the complete advertisement) or, instead, a description, link, pointer, or reference to such commercial content stored elsewhere.

It is to be understood that database 103 can be located inside ACM server 102 or, instead, co-located or remotely located from ACM server 102 and in communication with ACM server 102 either directly or via some intermediate computing device or server. Further, it is to be understood that database 103, as well as all uses herein of the term database, is intended to be interpreted broadly so as to cover any known or future developed data structure, format or approach for storing and/or accessing stored data or information (e.g., relational databases, flat databases, flat files, tables, trees, pointers, keys, references, linked-lists, etc.), and is therefore not intended to be limited to any particular database form or data structure.

Figure 2:
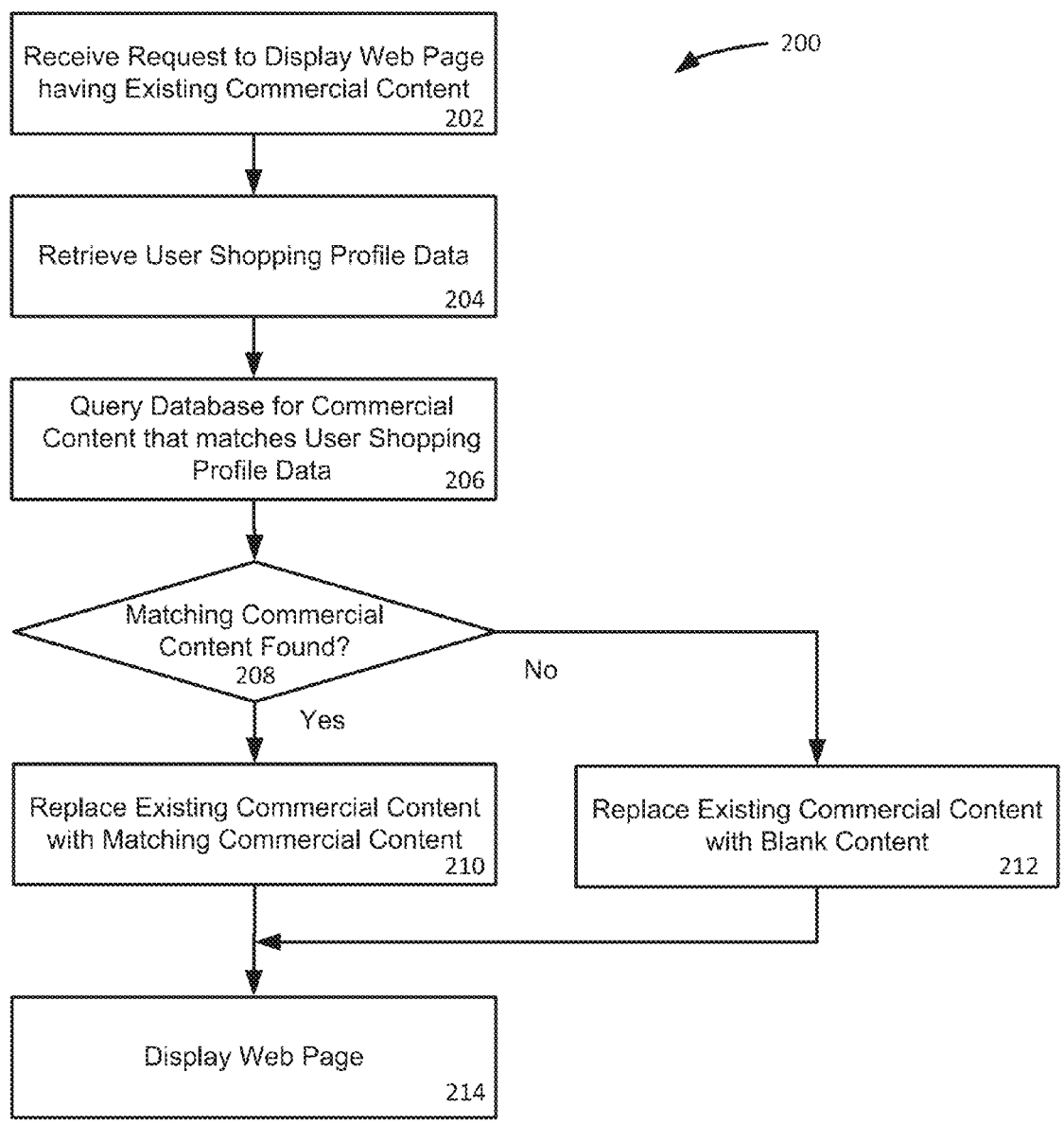
FIG. 2 is a flowchart depicting a method of replacing existing commercial content in a requested web page according to user profile data, according to an example embodiment.

Referring now to FIG. 2, a flowchart depicting a method 200 of replacing existing commercial content in a requested third party web page according to an example embodiment can be seen. It is to be understood that referring to the web page as being that of a third party is intended to indicate that the web page is not one originated or controlled by that of either ACM server 102 or user computing device 108. It is to be further understood that such a third party web page can be a web page of any type who generates revenue from included online advertising (referred to herein as commercial content in its broader definition) such as online newspapers, television stations, magazines, search engines, blogs, forums, email services, home pages, etc.

In an operation 202, a request is received to display the third party web page that has some existing commercial content. In an embodiment, such a request can be made by a user of user computing device 108 (of FIG. 1). Such request can be, for example, by the user clicking on a web site link of or entering a web address into user computing device 108.

In an operation 204, shopping profile data of the user is retrieved. In an embodiment, such retrieval is accomplished by the ACM application running on user computing device 108 sending a request across network 104 to ACM server 102 for the shopping profile data of the user stored in database 103. It is to be understood that user identification, as may be used to determine which user profile to retrieve, can be accomplished via user authentication techniques described herein or known in the art.

In an operation 206, a database is queried for commercial content that matches the user shopping profile data. In an embodiment, such query is accomplished by the ACM application running on user computing device 108 querying database 103, either directly or thorough ACM server 102, for commercial content stored thereon that matches the user shopping profile data received in operation 204.

In an alternative embodiment, ACM server 102 can perform operations 204 and 206 rather than computing device 108 thereby reducing processing load of computing device 108 as well as reducing overall data communications of the present approach. In such an alternative embodiment, ACM server 102 would receive a request from computing device 108 for commercial content that matches the user shopping profile data of the user and the ACM server 102 would itself retrieve the stored user shopping profile data and query database 103. ACM server 102 would then provide the query results in a response back to computing device 108.

In an operation 208, a determination is made as to whether any matching commercial content was found via the query operation 106. In an embodiment, such determination is accomplished by the ACM application funning on user computing device 108 evaluating the query results of operation 206.

If it is determined in operation 208 that matching commercial content was found then, in an operation 210, existing commercial content in the requested third party web page is replaced with the matching commercial content. In an embodiment, such replacement is accomplished by the ACM application running on user computing device 108.

Alternatively, if it is determined in operation 208 that matching commercial content was not found then, in an operation 212, existing commercial content in the requested third party web page is replaced with blank content or some other content selected by the user (e.g., a pet or landscape photograph). In an embodiment, such replacement is accomplished by the ACM application running on user computing device 108. It is to be understood that blank content is simply content that lacks any substantive value (e.g., white or grey space, cross-hatching or other X-out type display, silence, etc.).

Figure 3:
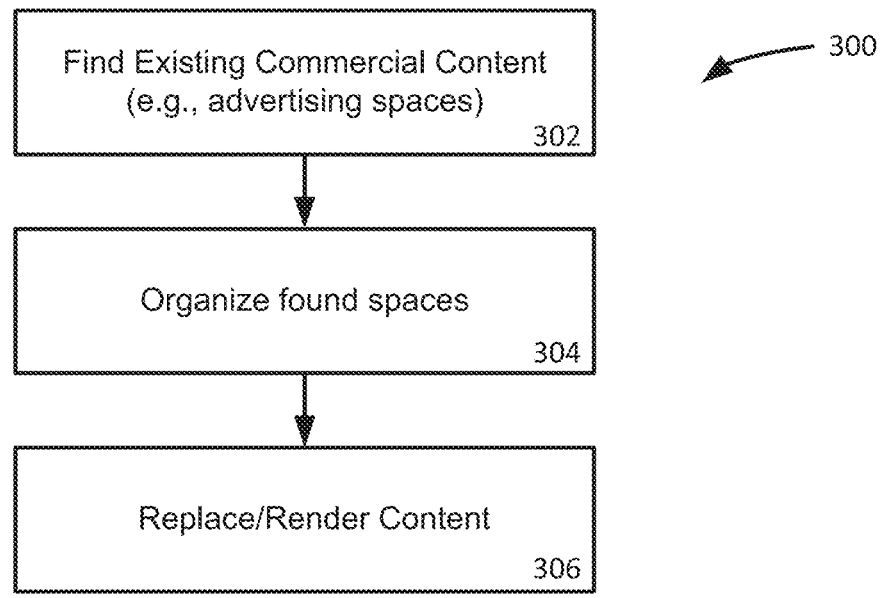
FIG. 3 is a flowchart depicting a portion of the method of FIG. 2.

Referring now to FIG. 3, replacement of existing commercial content in the requested third party web page, as occurs in operations 210 and 212 of FIG. 2, will now be explained.

In an operation 302, existing commercial content (e.g., advertising spaces) in the requested third party web page is found. In an embodiment, this is accomplished by the ACM application running on user computing device 108 matching a list of cascading style sheet (CSS) selectors (which may be retrieved across network 102 from ACM server 102) to CSS selectors on the requested web page.

Seen below is a table which lists sample CSS selectors that a third party web page may use to display commercial content that is especially disruptive advertising content. This list of sample CSS selectors can be created by an implementer of the present approach by investigating the content of various third party web pages and manually identifying relevant CSS selectors to be added to the list.

Table of sample CSS selectors:

```
51job.com#@##ad_left
51job.com#@##ad_right
52vfx.com#@##head_ad
bbs.9baka.com,bbs.9gal.com#@##top_ad
yocoy.com#@##AdArea
@@||ad.ourgame.com/cgi-bin/insertflasha.js
@@||cpro.baidu.com/cpro/ui/c.js$domain=bbs.9es.cn
@@||pos.baidu.com/ecom?$script,domain=bbs.9es.cn
@@||a.banggo.com/Ad/getAdPosList.shtml
@@/adbanner/*$image,domain=books.com.tw
@@||paipai.com $domain=shop.qq.com
@@/advertise/*$domain=suning.com
suning.com#@##topAd
!--bbs.vc52.cn
@@||gg.a.5d6d.$image,object_subrequest
@@||dianping.com/adwords/$xmlhttprequest
@@||union.mapbar.com/apis/maps/$script
||static.115img.com/static/115tj.js
||static.115img.com/static/delivery/
115.com##.banner-box
115.com##.banner-top
@@||analytics.163com/ntes.js$domain=cbg.163.com
||img1.126.net
||img2.126.net
||stat.ws.126.net
||163.com/special/*_*.xml
||adgeo.163.com
||g.163.com/*&affiliate=
```

In an operation 304, the found advertising space (commercial content) on the requested third party web page containing the existing commercial content is organized. In an embodiment, this is accomplished by the ACM application determining the size and placement of the existing commercial content, as well as whether any of them are physically adjacent to each other on the third party web page in order to amalgamate them and recalculate the total available commercial content space.

In an operation 306, the organized, existing commercial content is replaced with either matching commercial content, in operation 210, or blank content, in operation 212 (as explained with reference to FIG. 2). In an embodiment, this is accomplished by the ACM application replacing the existing commercial content, or more specifically with the amalgamated and recalculated commercial content space, with matching commercial content in operation 210 or blank content in operation 212.

Referring again to FIG. 2, in an operation 214, the requested third party web page is displayed. In an embodiment, this is accomplished by displaying on user computing device 108 the requested third party web page with matching commercial content and/or blank content. More particularly, in the case of replacing existing commercial content with matching commercial content, the ACM application running on user computing device 108 renders the matching commercial content (or blank content) into the organized space of the existing commercial content by rendering an iFrame to perform this action. One of skill in the art would know how to implement such an operation in light of the description herein.

In an alternative embodiment, the user can specify via some input or graphical user interface action that they would, instead, like to view the replaced existing commercial content on the displayed third party web page.

Referring now to FIG. 4, an example requested third party web page as would be displayed before and after application of the present approach can be seen.

In particular, an upper display window 401 is shown containing the third party web page as it would be displayed without using the present approach. As can be seen, existing commercial content is evident in advertising spaces 403, 405, 407, and 409. As can also be seen in upper display window 401 is existing content 411.

By contrast, a lower display window 413 is shown containing the same third party web page as it might be displayed using the present approach. As can be seen, the existing commercial content displayed in advertising spaces 403, 405, and 407 of upper display window 401 has, instead, been replaced by blank content 415, 417, and 419 in lower display window 413. Further, space taken up by the existing commercial content displayed in advertising space 409 has, instead, been organized such that existing content 411 has been moved up in lower display window 413 and matching commercial content 421 has been placed in the resulting organized space below existing content 411.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein, including the application described as being installed on the user computing device, may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
    receiving at a computing device a request from a user to view a third party web page, the third party web page having existing commercial content;
    retrieving, over a network by the computing device from an advertising control manager server, shopping profile data of the user;
    querying, over the network by the computing device, a database of the advertising control manager server for stored commercial content that matches the received shopping profile data of the user;
    replacing, by the computing device, the existing commercial content in the third party web page with matching commercial content if matching commercial content is found in the query of the database of the advertising control manager server;
    replacing, by the computing device, the existing commercial content in the third party web page with blank content if no matching commercial content is found in the query of the database of the advertising control manager server;
    wherein replacing the existing commercial content in the third party web page with the matching commercial content or the blank content is accomplished by:
        identifying existing commercial content space on the third party web page by matching one or more known cascading style sheet selectors to one or more cascading style sheet selectors on the third party web page;
        organizing the identified space based on size and placement of the identified space; and
        rendering the matching commercial content or the blank content in the organized identified space;
    and
    displaying on the computing device the third party web page with the matching commercial content or the blank content.

2. The method of claim 1 wherein the shopping profile data of the user is obtained by querying the user.

3. The method of claim 2 wherein the shopping profile data of the user obtained by querying the user is accomplished by queries generated by the computing device.

4. The method of claim 2 wherein the shopping profile data of the user obtained by querying the user is accomplished by queries generated by the advertising control manager and communicated over the network to the computing device.

5. The method of claim 2 wherein the shopping profile data of the user comprises areas of interest to the user, items the user anticipates purchasing, and demographic and geographic information about the user.

6. The method of claim 1 wherein the stored commercial content is obtained from an advertising exchange.

7. The method of claim 1 wherein the stored commercial content is obtained from an advertising network.

8. The method of claim 1 wherein the third party web page is that of an entity that earns revenue from included online advertising.

9. The method of claim 1 wherein the third party web page is an online search engine web page.

10. A method comprising:
    receiving at a computing device a request from a user to view a third party web page, the third party web page having existing commercial content;
    sending a request, from the computing device over a network to an advertising control manager server, to provide commercial content that matches stored shopping profile data of the user;
    receiving, at the computing device over the network from the advertising control manager server, a response to the request to provide commercial content;
    if the received response does include matching commercial content then replacing, by the computing device, the existing commercial content in the third party web page with the matching commercial content;
    if the received response does not include matching commercial content then replacing, by the computing device, the existing commercial content in the third party web page with blank content;
    wherein replacing the existing commercial content in the third party web page with the matching commercial content or the blank content is accomplished by:
        identifying existing commercial content space on the third party web page by matching one or more known cascading style sheet selectors to one or more cascading style sheet selectors on the third party web page;
        organizing the identified space based on size and placement of the identified space; and
        rendering the matching commercial content or the blank content in the organized identified space;
    and
    displaying on the computing device the third party web page with the matching commercial content or the blank content.

11. The method of claim 10, further comprising:
    receiving, at the advertising control manager, the request from the computing device to provide commercial content that matches stored shopping profile data of the user;
    querying, by the advertising control manager server, a database for commercial content that matches stored shopping profile data of the user; and
    sending, from the advertising control manager over the network to the computing device, the response to the request to provide commercial content.

12. A non-transitory machine-readable storage medium having instructions embodied thereon, the instructions executable by one or more processors to perform operations comprising:
    receiving at a computing device a request from a user to view a third party web page, the third party web page having existing commercial content;
    retrieving, over a network by the computing device from an advertising control manager server, shopping profile data of the user;
    querying, over the network by the computing device, a database of the advertising control manager server for stored commercial content that matches the received shopping profile data of the user;
    replacing, by the computing device, the existing commercial content in the third party web page with matching commercial content if matching commercial content is found in the query of the database of the advertising control manager server;

replacing, by the computing device, the existing commercial content in the third party web page with blank content if no matching commercial content is found in the query of the database of the advertising control manager server;

wherein the instructions for replacing the existing commercial content in the third party web page with the matching commercial content or the blank content further comprise instructions executable by one or more processors to perform operations comprising:

identifying existing commercial content space on the third party web page by matching one or more known cascading style sheet selectors to one or more cascading style sheet selectors on the third party web page;

organizing the identified space based on size and placement of the identified space; and rendering the matching commercial content or the blank content in the organized identified space; and displaying on the computing device the third party web page with the matching commercial content or the blank content.

* * * * *